United States Patent
MacInnis et al.

(10) Patent No.: US 7,305,036 B2
(45) Date of Patent: Dec. 4, 2007

(54) SYSTEM AND METHOD FOR ENTROPY CODE PREPROCESSING

(75) Inventors: Alexander G. MacInnis, Los Altos, CA (US); Vivian T. Hsiun, Yorba Linda, CA (US)

(73) Assignee: Broadcom Corporation, Irvine, CA (US)

( * ) Notice: Subject to any disclaimer, the term of this patent is extended or adjusted under 35 U.S.C. 154(b) by 608 days.

(21) Appl. No.: 10/273,744

(22) Filed: Oct. 18, 2002

(65) Prior Publication Data

US 2003/0219072 A1 Nov. 27, 2003

Related U.S. Application Data

(60) Provisional application No. 60/380,520, filed on May 14, 2002.

(51) Int. Cl.
H04N 7/12 (2006.01)

(52) U.S. Cl. .................................. 375/240.25

(58) Field of Classification Search ............... 348/426, 348/409, 438, 419, 410, 408, 384, 390, 411, 348/412, 420; 375/240.25, 240.24, 240.29, 375/240.16; 382/232, 244, 245, 246
See application file for complete search history.

(56) References Cited

U.S. PATENT DOCUMENTS

| | | | | |
|---|---|---|---|---|
| 5,371,547 A * | 12/1994 | Siracusa et al. | ....... | 375/240.01 |
| 5,504,823 A | 4/1996 | Yoon | | |
| 5,717,394 A | 2/1998 | Schwartz et al. | | |
| 5,963,260 A * | 10/1999 | Bakhmutsky | ........... | 375/240.24 |
| 6,647,061 B1 * | 11/2003 | Panusopone et al. | .. | 375/240.12 |
| 7,007,031 B2 * | 2/2006 | MacInnis et al. | ........... | 707/101 |
| 2002/0172280 A1 * | 11/2002 | Ducloux et al. | ....... | 375/240.12 |
| 2003/0138045 A1 * | 7/2003 | Murdock et al. | ...... | 375/240.12 |
| 2003/0189982 A1 * | 10/2003 | MacInnis | ............... | 375/240.24 |
| 2004/0010802 A1 * | 1/2004 | Visharam et al. | ............. | 725/95 |
| 2004/0030665 A1 * | 2/2004 | Sullivan | ...................... | 706/48 |

FOREIGN PATENT DOCUMENTS

EP 1 069 764 A 1/2001

OTHER PUBLICATIONS

Bakhmutsky M: "Pair-Match Huffman Transcoding to Achieve a Highly Parallel Variable Length Decoder with Two-Word Bit Stream Segmentation", Proceedings of the SPIE, SPIE, Bellingham, VA, USA; vol. 3021, Feb. 12, 1997 pp. 247-265, XP000648217, ISSN: 0277-786X.

* cited by examiner

*Primary Examiner*—Tung Vo
*Assistant Examiner*—Behrooz Senfi
(74) *Attorney, Agent, or Firm*—McAndrews Held & Malloy Ltd.

(57) ABSTRACT

A system and method for preprocessing a bitstream of compressed video data is presented herein. The bitstream of compressed video data can include, for example, a bitstream in accordance with the MPEG AVC standard. The bitstream is received and modified by a preprocessor to facilitate multi-row decoding. The modifications to the bitstream can include identification of starting points of macroblock rows with row headers. Additionally, multi-row decoding is further facilitated by generation of decode descriptors which indicate the starting row positions in the modified bit stream. Additionally, the modified bit stream can be formatted in accordance with a simpler coding scheme to simplify decompression.

25 Claims, 4 Drawing Sheets

|  | 0 | 1 | 2 | --- | m-1 |
|---|---|---|---|---|---|
| 0 | 0 | 0 | 0 | 0 | 0 |
| 1 | 0 | 1 | 1 | 1 | 1 |
| 2 | 1 | 1 | 0 | 0 | 0 |
| : |  |  |  |  |  |
| n-1 | 1 | 1 | 0 | 0 | 0 |

360

312(n-1, m-1)

SYSTEM AND METHOD FOR ENTROPY CODE PREPROCESSING

PRIORITY DATA

This application claims the priority benefit of Provisional Application Ser. No. 60/380,520 filed May 14, 2002.

RELATED APPLICATIONS

This application is related to Utility application Ser. No. 10/273,515, filed Oct. 18, 2002, and Provisional Application Ser. No. 60/382,267, filed May 20, 2002, each of which are incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention is related to digital video, and more particularly to a system and method for entropy code preprocessing.

A video sequence includes a series of images represented by frames. The frames comprise two-dimensional grids of pixels. An exemplary video sequence, such as a video sequence in accordance with ITU-656, includes 30 720×480 pixel frames per second. The foregoing results in a bit rate of approximately 165 Mbps for one video sequence.

Multiple video sequences are transmitted together on a communication medium such as a coaxial cable, using a multiple access scheme. The multiple access scheme can include, for example, frequency division multiple access (FDMA), or time division multiple access (TDMA). In a multiple access scheme each video sequence is associated with a particular channel. As the number of video sequences which are transmitted increases, the bandwidth requirements for the communication medium are further increased.

Accordingly, a number of data compression standards have been promulgated to alleviate bandwidth requirements. One of the most popular standards was developed by the Moving Pictures Experts Group (MPEG), and is known as MPEG. Pursuant to the MPEG standard, each picture is subdivided into regions of 16×16 pixels, each of which are represented by a macroblock. A macroblock stores luminance and chrominance matrices which are mapped to the 16×16 pixels. The macroblocks are grouped into any number of slice groups or slices. The MPEG standard has been subjected to a number of updates and revisions, resulting in numerous versions.

In a version known as MPEG-2, each of the slices contain macroblocks which are all in the same row and contiguous with respect to one another. The foregoing property permits transmission of a bit stream of the macroblocks in raster scan order by transmitting the slices in raster scan order. MPEG-2 also includes syntax indicating where each row in a picture begins. The indication of where each row in a picture begins permits decoding of multiple rows in parallel. Parallel decoding of multiple rows, known as multi-row decoding is especially useful for achieving a decoding rate sufficient for presentation of the video sequence on a video display.

More recent standards, such as the Joint Video Team (JVT) project of ISO-MPEG and ITU-VCEG, known as MPEG AVC or MPEG-4 Part 10, provide much better compression than MPEG-2, in terms of compressed bit rate for a given level of quality. This makes AVC attractive for commercial deployment. However, the AVC standard has a number of properties which make decoding substantially more complicated. For example, the macroblocks forming a slice are not necessarily spatially contiguous. Slice groups can include macroblocks that are throughout the entire picture with macroblocks from other slices groups interspersed therebetween. Additionally, new rows do not necessarily begin in a new slice and an AVC bitstream does not necessarily indicate where each row starts. The foregoing make multi-row decoding difficult.

Additionally, compressed video standards such as MPEG-2 and MPEG AVC include specifications for encoding various syntax elements using either variable length codes or arithmetic coding; these methods are referred to as entropy coding, since they take advantage of the probabilities of the various values that the syntax elements can take on, and they generally produce different numbers of bits to indicate the information that needs to be conveyed. Some of these formats, particularly adaptive arithmetic coding such as CABAC in AVC, adapt the meaning of each transmitted bit according to the sequence of bits previously transmitted in the same slice. That is, the interpretation of each bit is dependent on previous bits. Therefore it is generally not possible to begin decoding from a mid-point of a slice without having already decoded all the previous bits in the same slice. This makes multi-row decoding of streams encoded using CABAC extremely difficult.

Multi-row decoding is valuable for a number of reasons. One major reason is achieving the decoding performance requirements. The video sequence is transmitted at rates that may range from less than 1 Mbps up to 20 Mbps in most applications. However, due to the wide variations in the number of bits associated with each picture and with each macroblock of each picture, the peak decoding rate required for displaying a video sequence in real time can be as high as 750-1000 Mbps.

Accordingly, it would be beneficial if multi-row decoding of compressed video data could be facilitated.

Further limitations and disadvantages of conventional and traditional approaches will become apparent to one of skill in the art, through comparison of such systems with embodiments of the present invention as set forth in the remainder of the present application.

BRIEF SUMMARY OF THE INVENTION

A system and method for facilitating multi-row decoding of compressed video data and for facilitating decoding of entropy coded data is presented herein. The bit stream of compressed video data is preprocessed by a preprocessor prior to storage in a compressed data buffer. The preprocessor parses and modifies the bit stream of compressed video data and places the modified bit stream of compressed video data in a compressed data buffer. The modifications facilitate multi-row decoding by a decompression engine.

In one embodiment, the preprocessor modifies the bit stream of compressed video data by inserting byte aligned slice headers which indicate the start of a macroblock row. The preprocessor can also provide ancillary information which indicate the memory address in the compressed data buffer of the starting points of the macroblock rows.

In another embodiment, the preprocessor replaces the bit stream of compressed video data with another bit stream. The other bit stream represents the compressed video data in a format that eliminates the dependencies between bits that would otherwise have made multi-row decoding difficult or impossible. The simpler format for decoding allows the decompression engine to decode the bit stream using multi-row decoding.

These and other advantages and novel features of the present invention, as well as details of an illustrated embodiment thereof, will be more fully understood from the following description and drawings.

DETAILED DESCRIPTION OF THE INVENTION

Figures 1, 3:
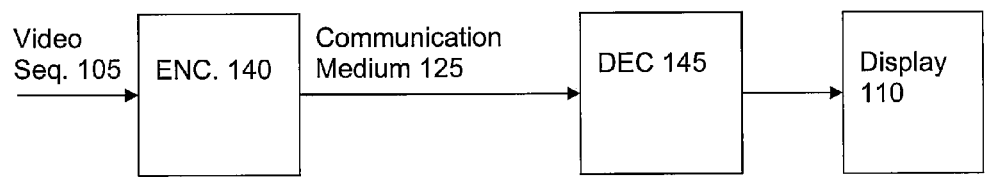
FIG. 1 is a block diagram of an exemplary system for transmitting video data to a display unit.
FIG. 3 is a block diagram of an exemplary slice group scheme.

Although the illustrated embodiments are described with emphasis on the AVC standard, it should be noted that the present invention is not limited to the AVC standard and is applicable in other contexts. Referring now to FIG. 1, there is illustrated a block diagram of an exemplary transmission system for providing a video sequence 105 to a display unit 110 over a communication medium 125. A video sequence 105 includes a series of images represented by frames. The frames comprise two-dimensional grids of pixels. An exemplary video sequence 105, such as a video sequence in accordance with ITU-656, includes 30 720×480 pixel frames per second.

The communication medium 125 may comprise either a point-to-point link or a network of links, or any combination thereof. The network of links may include either a broadcast network, a switched network, or a packet switched network, such as the internet, or any combination thereof. The links may include, for example, a coaxial cable, an Ethernet connection, a Digital Subscriber Loop (DSL), an optical fiber, a satellite/radio link, or a phone line.

The video sequence 105 is received by encoder 140. The encoder 140 encodes the video sequence 105 pursuant to the AVC standard. The AVC standard is described in the MPEG AVC Final Committee Draft (FCD), which is incorporated by reference herein, in its entirety. Pursuant to the AVC standard, the video sequence 105 is represented by a bitstream including a series of data packets, known as AVC packets 142. The bitstream of AVC packets 142 are transmitted over the communication channel 125 and received by a decoder 145. The decoder 145 decodes the AVC packets, providing video sequence 105' which is typically imperceptibly different from video sequence 105 to the human eye. The video sequence 105' is provided for display to the display unit 110.

Figure 2:
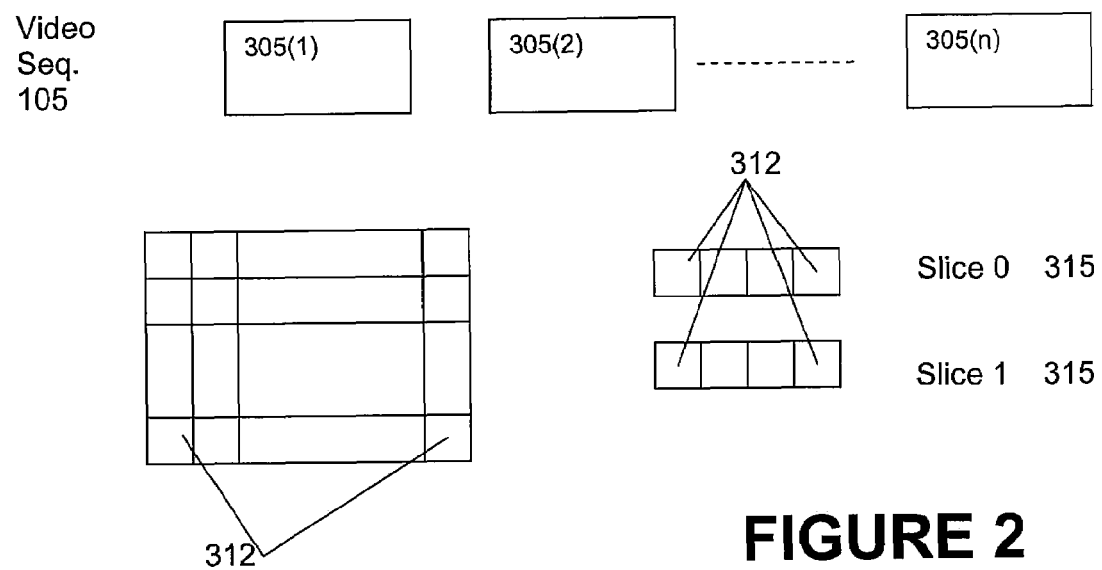
FIG. 2 is a block diagram of an exemplary compression hierarchy.

Referring now to FIG. 2, there is illustrated a block diagram of the AVC stream hierarchy. A video sequence 105 includes a series of pictures 305. Each picture 305 comprises encoded data representing a two-dimensional array of pixels. Each picture 305 is further divided into macroblocks 312 wherein each macroblock 312 comprises encoded data representing 16×16 segments of the two dimensional array of pixels.

A picture 305 may be divided into slices 315, wherein each slice 315 includes any number of encoded macroblocks 312. In certain versions of MPEG, such as MPEG-2, slices 315 include contiguous macroblocks 312 from left to right, and consecutive slices are in order from left to right and top to bottom. However, in AVC, the macroblocks 312 forming a slices 315 are not necessarily contiguous. Slices 315 can include macroblocks 312 that are throughout the entire picture 305 with macroblocks 312 from other slices 315 interspersed therebetween. The foregoing is known as Flexible Macroblock Organization (FMO). When FMO is utilized in AVC, slices are generally organized into slice groups.

Referring now to FIG. 3, there is illustrated an exemplary macroblock map. The macroblocks 312 are mapped to a picture 305 forming any number of sequential rows 360 of sequential macroblocks 312. The macroblocks 312 in the present example are grouped into two slice groups 315, slice group 0, and slice group 1. In the illustration, the macroblocks 312 which are grouped into slice group 0 are labeled with the reference numeral 0, while the macroblocks 312 which are grouped into slice group 1 are labeled with the reference numeral 1.

As can be seen in the present illustrated example, both slice group 0, and slice group 1 are non-contiguous and cover the entire picture 305. Additionally, macroblocks 312 of slice group 0 are interspersed between the macroblocks 312 of slice group 1 and vice versa. Additionally, new rows 360 do not necessarily coincide with changes in slice groups. For example, macroblock 312(2,0) is the first macroblock of row 360(2). However the sequentially preceding and succeeding macroblocks 312(1,m−1) and 312(2,1) are also in the same slice group 315, e.g., slice group 1. The macroblocks 312 are transmitted in a bitstream one slice group at a time, e.g., slice group 0, and then slice group 1, over the communication medium 125 to the decoder 145.

Referring now to FIG. 4, there is illustrated an exemplary bitstream 142 transmitting the macroblocks 312 shown in FIG. 3. The macroblocks 312 are indicated by vertical dashed lines, however, the macroblocks 312 do not necessarily begin or end on identifiable bit or byte boundaries. As noted above, the macroblocks 312 of slice group 0 are followed by the macroblocks 312 of slice group 1.

The macroblocks 312 are represented by a set of variable length codes. There is no indication in the bitstream 142 indicating which macroblock 312 starts a new row. For example, macroblock 312(0,m−1) and macroblock 312(1,0) are sequentially encoded with no indicator indicating that row 1 starts at the location of macroblock 312(1,0) in the bitstream 142.

Discontinuities in the sequence of macroblocks 312 within the slice group 315 are indicated by an entropy coded syntax element 415, mb_skip_run (skipped macroblocks), which indicates the number of skipped macroblocks until the next macroblock in the bitstream 142. For example, macroblock 312(1,0) is followed by variable syntax element 415 indicating m+1 skipped blocks.

Figure 5:
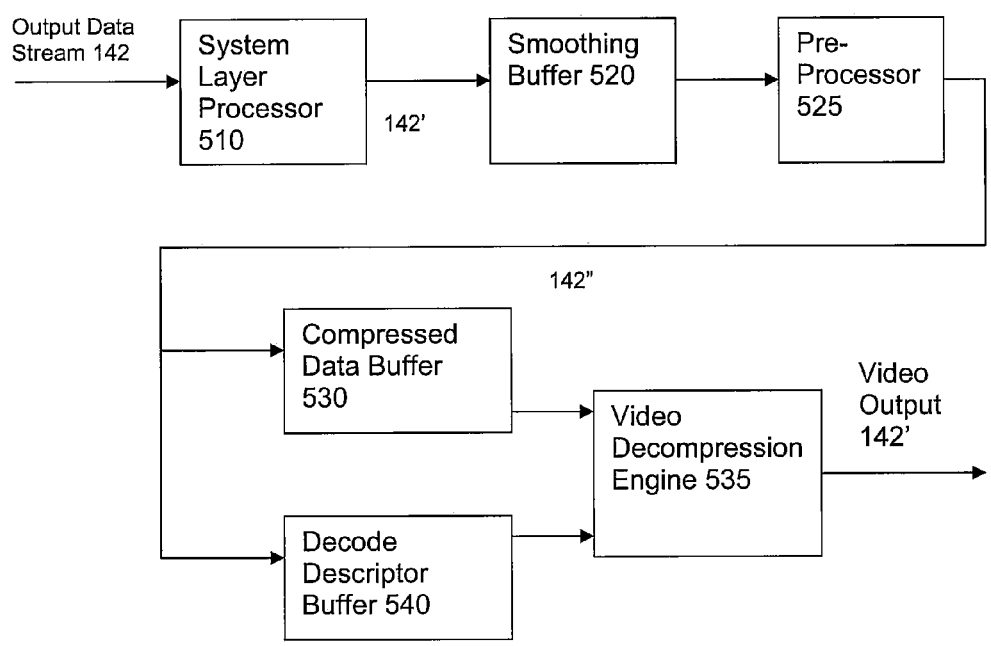
FIG. 5 is a block diagram of an exemplary decoder in accordance with an embodiment of the present invention.

Referring now to FIG. 5, there is illustrated a block diagram describing an exemplary decoder 505 in accordance with an embodiment of the present invention. The decoder 505 receives and decompresses the bitstream 142. Decompression of the bitstream is achieved by a video decompression engine 535. The video decompression engine 535 decompresses a bitstream of compressed video data, and thereby produces a video sequence 105'. The video sequence 105' is displayable by a display unit, such as display unit 110. The bitstream 142 is received at a rate that may vary from less than 1 Mbps to 20 Mbps. However, due to the wide variation in the number of bits associated with each macroblock and with each picture, the peak decoding rate for the video decompression engine 535 for providing a video sequence 105' for display in real time can be as high as 750-1000 Mbps. Due to the high peak performance requirements for the video decompression engine 535, it is preferable for the decompression engine to multi-row decode the macroblocks 312 in parallel. Accordingly, the bitstream 142 is preprocessed prior to decompression to facilitate multi-row decoding and to facilitate simpler processing of the data stream.

The bitstream 142 is received by the system layer processor 510. The system layer processor 510 parses the system layer, extracting elementary video stream data and any system layer information that may be necessary for decoding and display, such as time stamps. The output of the system layer processor is a bitstream 142 comprising video elementary stream data 142.

The bitstream 142 can be written to a smoothing buffer 520. The smoothing buffer 520 may be implemented as an Static Random Access Memory (SRAM) on-chip or as a region of Dynamic RAM (DRAM) off-chip. The smoothing buffer 520 stores the data temporarily and smoothes the data rate.

The bitstream 515 is read by a preprocessor 525. The preprocessor 525 parses and modifies the bitstream 142 and places a modified bitstream 142' in a compressed data buffer 530. The modifications to the bitstream 515 facilitate multi-row decoding by a decompression engine 535.

The preprocessor 525 segments the bitstream 142' into data groupings of interest which may be selected to facilitate parallel decoding operations, such as macroblock rows. The remainder of this description will be illustrated with an emphasis on data groupings that include macroblock rows, with the understanding that other data groupings are also possible.

Where the bitstream 142 comprises AVC encoded data, the preprocessor 525 preferably modifies the bitstream 142 to remove dependencies between bits within a slice, as necessary to facilitate multi-row decoding. For example, where the bitstream 142 comprises data encoded with the AVC CABAC format, the bitstream may be transcoded to a modified bitstream 142' conveying the same information in a more simplified variable length coding format, or a fixed length format that can be decoded starting from a point other than the beginning of a slice. In one embodiment, the bitstream 142 can be transcoded to modified bitstream 142' as is described in further detail in "System and Method for Transcoding Entropy-Coded Bitstreams", by MacInnis, et. al., U.S. application for patent Ser. No. 10/273,515, filed Oct. 18, 2002, which is hereby incorporated by reference in its entirety.

Figure 4A:
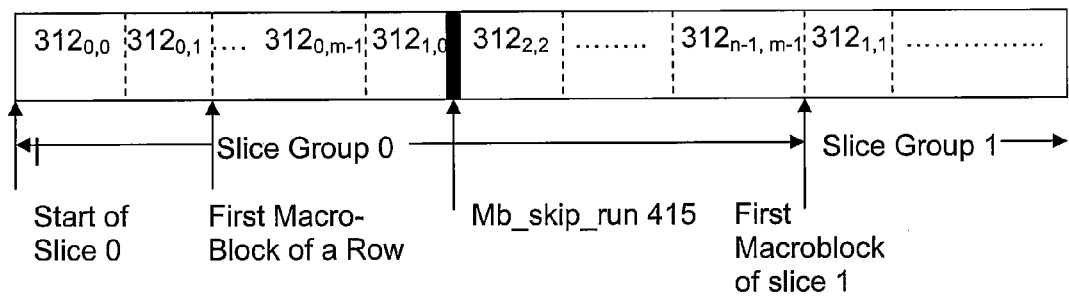
FIG. 4A is a block diagram of an exemplary bitstream.
Figure 4B:
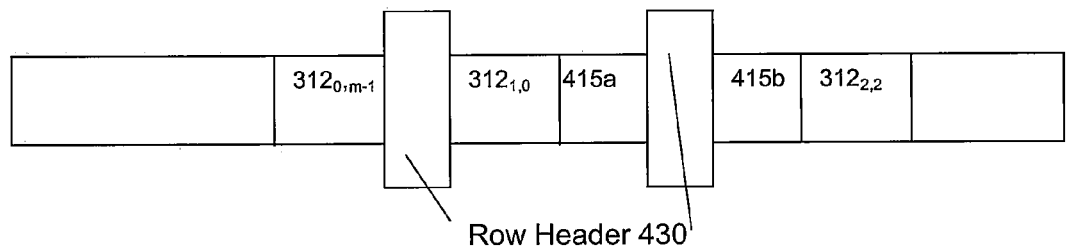
FIG. 4B is a block diagram of an exemplary bitstream modified in accordance with an embodiment of the present invention.

Referring now to FIG. 4B, there is illustrated an exemplary modified bitstream 142' representing modifications to bitstream 142 of FIG. 4A. The syntactical portions of the bitstream are parsed to locate the points therein where macroblock rows start. The syntax is modified to include row headers 430 where the macroblock rows 360 start and to byte align each row. The byte alignment and headers 430 indicating the start of a row preferably follow the same syntax followed by the slice header as specified in the AVC standard, although a wide variety of different syntaxes can be followed.

The beginning of each row is found by parsing the bitstream 142 from the beginning of each slice until at least the beginning of each row that is to be identified. For example, the choice of which variable length code table is used to decode a particular element may depend on the value of one or more previously decoded elements. In some cases the values of the elements may be discarded once each syntax element has been parsed.

Additionally, the preprocessor 525 also performs the inverse of the anti-emulation process specified in AVC. The forward anti-emulation process inserts data according to a specified algorithm as a means to prevent video elementary stream data from accidentally having strings of bits that match the start code prefix. The inverse of the anti-emulation process is advantageously performed by the preprocessor 525 because of the high peak performance rates required of the decompression engine 535 and because performing this function in the pre-processor helps to facilitate multi-row decoding.

As noted above, the macroblocks 312 of the slice groups 315 encoded together are not continuous with respect to the raster scan order. The foregoing discontinuities are indicated by the skipped macroblocks parameter 415. In some cases, the value of the skipped macroblock parameter 415 and its location in the bitstream 142 may be such that the run of skipped macroblocks falls on two or more macroblock rows 360. In order to mark the beginning of the second and succeeding rows, the preprocessor 525 changes the skipped macroblocks parameter 415. The skipped macroblocks parameter 415 is changed to include a first skipped macroblocks parameter 415a indicating a number of skipped macroblocks which extends to the end of the first row. The first skipped macroblocks parameter 415 is followed by an inserted a row header 430. Following the row header 430, the preprocessor 525 inserts another skipped macroblocks parameter 415b indicating the remaining number of macroblocks that are skipped.

If the remaining number of macroblocks that are skipped from the row header 430 extend into another row, macroblock parameter 415b indicates the number of macroblocks extending to the end of the row, another row header 430 is inserted, and another macroblock parameter 415b indicates the number of skipped macroblocks from the next row header 430.

For the exemplary macroblock of FIG. 3, a row header 430 is inserted immediately after the portion of the bitstream 142 encoding macroblock 312(0,m−1), indicating the start of row 1. In the bitstream 142, macroblock 312(1,0) is followed by the skipped macroblock parameter 415 indicating that m+1 macroblocks are to be skipped, i.e., macroblock 312(2,2) is the next macroblock in the bitstream 142.

The preprocessor 525 replaces the skipped macroblock parameter 415 with a first skipped macroblock parameter 415a indicating that m−1 macroblocks are skipped. The first skipped macroblock parameter 415a is followed by a row header 430, indicating the start of row 2. The row header 430 indicating the start of row 2 is byte aligned and followed by a second skipped macroblock parameter 415b indicating that 2 macroblocks are skipped. After the second macroblock parameter 415b, the macroblock 312(2,2) follows.

Referring again to FIG. 5, the resulting modified bitstream 142' is written to the compressed data buffer 530. The compressed data buffer 530 is typically a large buffer implemented in DRAM, with a size of typically several hundred kilobytes to one or more megabytes. Additionally, in an exemplary embodiment the preprocessor 525 generates decode descriptors indicating the addresses in the compressed data buffer 530 where each of the macroblock rows 360 begin. The decode descriptors are stored in a decode descriptor buffer 540.

The video decompression engine 535 can then decompress bitstream 142' in a parallel, multi-row fashion. Multi-row decompression is described in greater detail in "System for and Method of Decoding of Interleaved Macroblocks of Video", Provisional Application for Patent Ser. No. 60/382,267, filed May 20, 2002, by MacInnis, et. al, which is incorporated by reference herein, in its entirety.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A decoder for decoding a bitstream, said bitstream comprising compressed video data, said decoder comprising:
    an input for receiving the bitstream not including indications of every macroblock row starting points;
    a processor for modifying the bitstream and generating indications of macroblock row starting points; and
    a decompression engine for decompressing the modified bitstream.

2. The decoder of claim 1, wherein the bitstream of compressed video data represents a picture comprising a plurality of sequential rows, wherein each of said plurality of sequential rows further comprise a corresponding plurality of sequential macroblocks, and wherein the processor identifies at least one position in the bitstream, wherein the position identifies a macroblock, wherein the identified macroblock is a sequentially first macroblock in a particular one of said plurality of sequential rows.

3. The decoder of claim 2, wherein the bitstream comprises a first macroblock followed by a second macroblock, wherein the first macroblock is in a first row and wherein the second macroblock is in a second row, and wherein the processor inserts a first indicator indicating a number of sequential macroblocks in the first row which follow the first macroblock, and a second indicator indicating a number of sequential macroblocks in the second row which preceded the second macroblock.

4. The decoder of claim 2, wherein the processor inserts a header at said at least one position.

5. The decoder of claim 4, wherein the row header is bit aligned in the modified bitstream.

6. The decoder of claim 1, further comprising:
    a compressed data buffer for buffering the modified bitstream.

7. The decoder of claim 1, further comprising:
    a smoothing buffer for providing the bitstream to the processor.

8. The decoder of claim 1, wherein the processor inverses anti-start code emulation.

9. The decoder of claim 1, wherein the processor transcodes the bitstream from an entropy-coded format to a second format.

10. The decoder of claim 9, wherein the second format comprises codes that can be independently decoded.

11. A method for decoding a bitstream, the method comprising:
    receiving the bitstream, wherein the bitstream comprises compressed video data not including indications of every macroblock row starting point;
    modifying the bitstream, thereby generating a modified bitstream with macroblock row starting point indicators; and
    decompressing the modified bitstream.

12. The method of claim 11, wherein the bitstream of compressed video data represents a picture comprising a plurality of rows, wherein each of said plurality of sequential rows further comprise a corresponding plurality of sequential macroblocks, and wherein modifying the bitstream further comprises:
    identifying at least one position in the bitstream, wherein the position identifies a macroblock, wherein the identified macroblock is a sequentially first macroblock in a particular one of said plurality of rows.

13. The method of claim 12, wherein the bitstream comprises a first macroblock followed by a second macroblock, wherein the first macroblock is in a first row and wherein the second macroblock is in a second row, and wherein modifying the bitstream further comprises:
    inserting a first indicator indicating a number of sequential macroblocks in the first row which follow the first macroblock;
    inserting a header; and
    inserting a second indicator indicating a number of sequential macroblocks in the second row which preceded the second macroblock.

14. The method of claim 12, wherein the modifying the bitstream further comprises:
    inserting a header at said at least one positions.

15. The method of claim 14, wherein inserting the header further comprises:
    inserting the header wherein the header is bit aligned in the modified bitstream.

16. The method of claim 15, further comprising:
    buffering the modified bitstream.

17. The method of claim 11, further comprising inversing anti-start code emulation in the bitstream before decompressing the modified bitstream.

18. The method of claim 11, wherein modifying the bitstream further comprises transcoding the bitstream from a first format to a second format.

19. The method of claim 18, wherein the second format comprises codes which can be independently decoded.

20. A method of decoding video data comprising:
    receiving a stream of video data not having indications of all macroblock row starting points;
    determining macroblock row starting points in the stream;
    providing indications in the stream of macroblock row starting points; and
    parallel decoding of a plurality of rows of video data based on the indications.

21. The method of claim 20, further comprising:
    transcoding the stream of video data from a first format to a second format.

22. The method of claim 21, wherein parallel decoding further comprises:

parallel decoding of a plurality of rows of video data based on the second format.

23. The decoder of claim 1, wherein the processor determines the macroblock row starting points based on skipped macroblock parameters.

24. The method of claim 11, further comprising:
detecting the macroblock row starting points based on skipped macroblock parameters.

25. The method of claim 20, wherein determining macroblock row starting points in the stream further comprises detecting the row starting points based on skipped macroblock parameters.

* * * * *